US009264397B2

(12) United States Patent
Meyer et al.

(10) Patent No.: US 9,264,397 B2
(45) Date of Patent: Feb. 16, 2016

(54) METHOD AND SYSTEM FOR IMPLEMENTING A USER NETWORK IDENTITY ADDRESS PROVISIONING SERVER

(71) Applicant: BlueCat Networks, Toronto (CA)

(72) Inventors: Steven P. Meyer, Richmond Hill (CA); Richard N. Hyatt, Markham (CA)

(73) Assignee: BLUECAT NETWORKS (USA) INC., Toronto (CA)

( * ) Notice: Subject to any disclaimer, the term of this patent is extended or adjusted under 35 U.S.C. 154(b) by 358 days.

(21) Appl. No.: 13/654,033

(22) Filed: Oct. 17, 2012

(65) Prior Publication Data

US 2013/0103819 A1    Apr. 25, 2013

Related U.S. Application Data

(60) Provisional application No. 61/548,678, filed on Oct. 18, 2011.

(51) Int. Cl.
| G06F 15/177 | (2006.01) |
| H04L 29/12 | (2006.01) |
| H04L 9/00 | (2006.01) |
| G06F 15/173 | (2006.01) |

(52) U.S. Cl.
CPC .......... *H04L 61/2007* (2013.01); *G06F 15/177* (2013.01); *H04L 9/00* (2013.01); *H04L 61/103* (2013.01); *H04L 61/2076* (2013.01); *H04L 61/2084* (2013.01)

(58) Field of Classification Search
CPC ............ H04L 61/2007; H04L 61/2084; H04L 61/103; H04L 61/2076; G06F 15/177
USPC .......................................... 709/223, 220, 222
See application file for complete search history.

(56) References Cited

U.S. PATENT DOCUMENTS

2008/0304457 A1    12/2008  Thubert et al.
2009/0005005 A1*   1/2009   Forstall et al. ................ 455/411

OTHER PUBLICATIONS

TetherNet Documentation, XP007921474.*
Cisco, "Locator ID Separation Protocol (LISP) VM Mobility Solution White Paper", Mar. 28, 2011, pp. 1-68, http://www.cisco.com/c/en/us/products/collateral/switches/nexus-7000-series-switches/white_paper_c11-693627.pdf.*
International Search Report and Written Opinion dated Feb. 18, 2013, for PCT Application No. PCT/EP2012/070699.
Touch et al., "TetherNet Anti-NAT-secure Internet subnet rental system", Proceedings Darpa Information Survivability Conference Andexposition. Discex, vol. 2, „Jan. 1, 2003, pp. 112-114.
"TetherNet Documentation" Feb. 3, 2004 url: http//isi.edu/tethernet/tethernet/doc/documentation.html.
Richter, T, "TheGreenBow IPSec VPN Client Konfigurationsbeispiel AVM Fritz!Box Fon WLAN 7270" Configuration Guide, Dec. 1, 2009, pp. 1-15.

(Continued)

*Primary Examiner* — Hee Soo Kim
(74) *Attorney, Agent, or Firm* — Vista IP Law Group, LLP

(57) ABSTRACT

A number of computing devices associated with a particular user have a network capability between them for management and control, said capability to enable these devices, running on different, physically distributed hardware, to interwork securely and privately.

37 Claims, 15 Drawing Sheets

(56) References Cited

OTHER PUBLICATIONS

Cisco Systems et al., "Cisco IOS LISP Application Note Series: Lab Testing Guide", LISP Application Note Series, Apr. 28, 2011, pp. 1-13.

Farinacci et al., "Cisco Systems,"Locator/ID Separation Protocol (LISP); draft-ietf-lisp-15.txt, Internet Engineering Task Force, IETF, StandardWorkingDraft, Internet Society (ISOC) 4, Switzerland, No. 15, Jul. 9, 2011, pp. 1-90.

Craig Hill et al., "Network-Based Protocol Innovations in Secure Encryption Environments" Cisco Systems, Inc., 2011, 11 pages.

V. Ermagan et al., "NAT traversal for LISP" Network Working Group, Internet-Draft, Mar. 26, 2012, 27 pages.

Jerry Hildenbrand, "Android 101: Tethering" Android Central, May 17, 2010, 14 pages.

D. Farinacci et al., "LISP Mobile Node" Network Working Group, Internet-Draft, Apr. 23, 2012, 23 pages.

D. Farinacci et al., "Locator/ID Seperation Protocol (LISP)", Network Working Group, Internet-Draft, May 4, 2012, 98 pages.

International Search Report and Written Opinion dated Feb. 18, 2013 for PCT Patent Application No. PCT/EP2012/070699.

Richter, T, "TheGreenBow IPSec VPN Client Konfigurationsbeispiel AVM Fritz!Box Fon WLAN 7270", Configuration Guide, Dec. 1, 2009, 16 pages.

Cisco Systems et al., "Cisco IOS LISP Application Note Series: Lab Testing Guide", LISP Application Note Series, Apr. 28, 2011, 14 pages.

Farinacci et al., Locator/ID Speration Protocol (LISP); Engineering Task Force, IETF, Standardworkingdraft, Internet Society 4, Switzerland, Jul. 9, 2011, 6 pages.

"TetherNet Documentation", Feb. 3, 2004, 18 oages url: http://isi.edu/tethernet/tethernet/doc/documentation.html.

Touch et al., "TetherNet Anti-NAT-Secure Internet Subnet Rental System", Proceedings Darpa Information Survivability Conference and Exposition, Jan. 1, 2003, 4 pages.

Farinacci et al., "Locator/ID Separation Protocol (LISP)", draft-ietf-lisp-15, Networking Working Group, Jan. 10, 2012, 84 pages.

PCT Written Opinion for PCT/EP2012/070699, Applicant BlueCat Networks, Form PCT/IPEA/408, dated Sep. 30, 2013 (8 pages).

Non-final Office Action dated Dec. 18, 2014 for U.S. Appl. No. 13/738,761.

Non-final Office Action dated Jan. 5, 2015 for U.S. Appl. No. 13/738,782.

Non-final Office Action dated Jan. 15, 2015 for U.S. Appl. No. 13/738,802.

Final Office Action dated Apr. 8, 2015 for U.S. Appl. No. 13/738,761.

Final Office Action dated Apr. 8, 2015 for U.S. Appl. No. 13/738,802.

Final Office Action dated Apr. 10, 2015 for U.S. Appl. No. 13/738,782.

European Office Action dated Apr. 22, 2015, for corresponding EP Patent Application No. 12778705.9, 9 pages.

Notice of Allowance and Fees due dated Nov. 17, 2015 for related U.S. Appl. No. 13/738,782.

\* cited by examiner

502

```
Db table: Member

Username: name of user
Fullname: display name of user (optional)
Password: encoded password
    stored as;
    base64(digest_sha1(rawpassword+authid))
Authid: unique user id (e.g. staff number)
Phone: phone number (optional)
Location: City or other location (optional)
Email: email address of user
user_prefix: 64-bit IPv6 prefix assigned by server
```

Db table: System

Provider_prefix: IPv6 prefix
Prefix_len: length of the provider prefix (in bits)
Organization: name of the organization/group

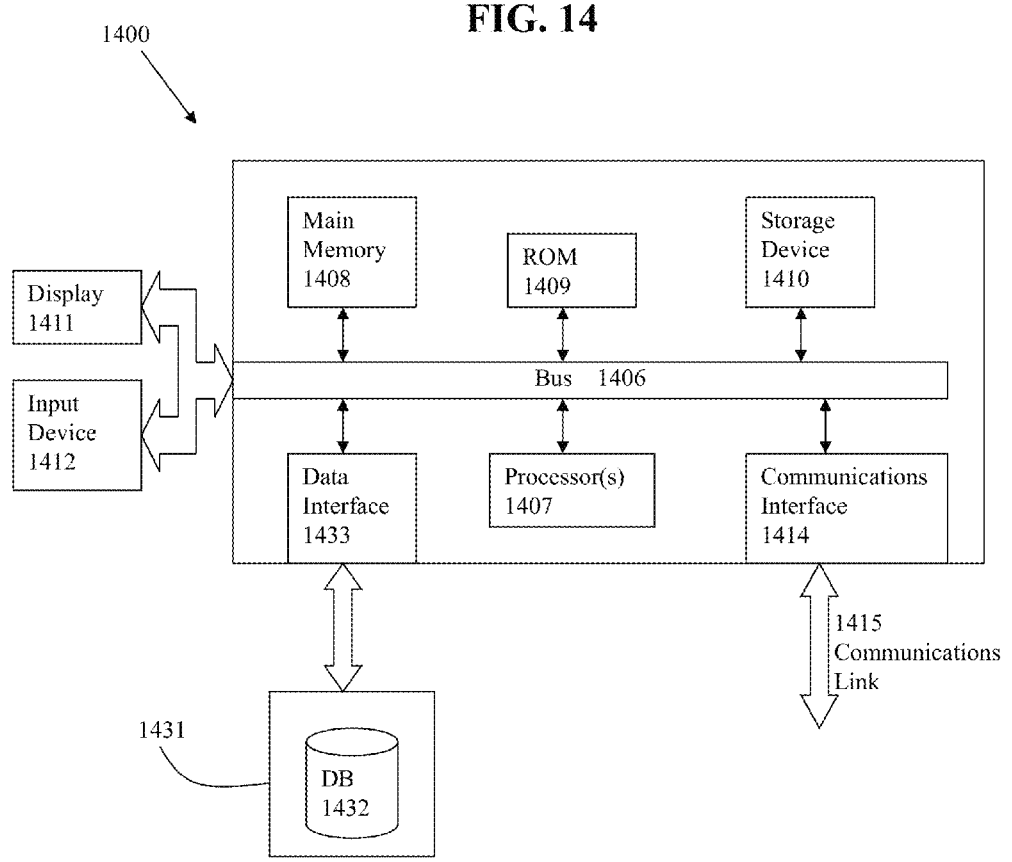

METHOD AND SYSTEM FOR IMPLEMENTING A USER NETWORK IDENTITY ADDRESS PROVISIONING SERVER

CROSS-REFERENCE TO RELATED APPLICATIONS

The present application claims the benefit of priority to U.S. Provisional Application Ser. No. 61/548,678, filed on Oct. 18, 2011, which is hereby incorporated by reference in its entirety.

FIELD

This disclosure is directed to Internet Protocol (IP) networking communications.

BACKGROUND

In the current proliferation of Internet Protocol (IP) networking devices and virtual machine devices, there are typically two ways that individual computing devices are located on a network. The first is by means of an IP address, usually conforming to IPv4, but which may also be conforming to IPv6. IPv4 addresses are often assigned within a local numbering plan and utilize network address translation (NAT) in order to communicate via one or more routers over the Internet. NAT addresses are not generally usable for incoming connections from arbitrary Internet locations, and therefore most such devices are not intended to run applications that provide services to other devices via the network protocol. This presents a challenge for devices that require incoming connections.

The second approach is by means of a domain name via a Domain Name System (DNS) such as in the case of an addressable service. Dynamic updates of the DNS (DDNS) are commonly used to support devices with IP addresses that change, but DNS names must resolve to accessible addresses in order to be useful. Most user-specific client devices do not have addressable services, and therefore do not use DNS entries. In addition, solutions such as Dynamic DNS updates are not able to support propagation of rapidly changing addresses and therefore do not offer a reliable method of ensuring connectivity. However, the need for such services is growing with the needs of modern applications, such as gaming, VoIP, and other peer-to-peer applications.

A significant trend is the increasing proliferation of computing devices per user. Users are currently holders and owners of multiple devices, such as smartphones, PCs, laptops, tablet computers, gaming devices and may in future also use many more devices, for example; telepresence devices, medical monitoring devices and personal robotic devices. The depletion of the current IPv4 address space and the complexities associated with Network Address Translation (NAT) require the use of IPv6 to satisfy the addressing needs of large numbers of devices coming on line. However, the move to IPv6 will require significant infrastructure upgrades before this can happen.

Another trend is the growing number of mobile devices that are being used. The proliferation of various personal mobile computing devices presents a challenge for the registration, provisioning and tracking of these devices. For example, this has led to the situation where a mobile device may frequently change its IP address as it relocates. During relocation, the device may have multiple, active IP addresses. This means that an IP address cannot be used as a device identifier, even within a communication session, and such addresses may change unpredictably. Attempts to use additional protocols such as SIP (Session Initiation Protocol) to resolve this issue have also been employed but do not prevent short term communication interruptions.

In order to maintain an addressing identity, a different addressing strategy must be used. One such strategy that is part of mobile IPv6 is to assign a home address to a device and have a home router that is able to track the real device address and route network packets to the device when required. Another applicable technology is the Locator/ID Separation Protocol (LISP) that requires a particular router infrastructure to simplify mobile addressing issues.

Yet another trend is the ease with which cloud-based applications and services can be deployed. It is desirable that users are able to call up applications and services on demand from a wide range of cloud providers and have them included within their own, personal network. Hence the automatic provisioning of virtual machine devices is very desirable, and being able to identify the virtual machine devices by IP address is a significant issue.

Therefore, there is a need for an improved approach to implement network association between devices that are associated with a particular user, to provide management and control over the devices, and to enable these devices to have a special messaging relationship with each other.

SUMMARY

Some embodiments of the invention provide a method and mechanism for associating a number of computing devices with a particular user, with a network capability between them for management and control. This capability enables the devices, running on different, physically distributed hardware, to interwork securely and privately as if they were directly connected on a local IPv6 network dedicated to the user. Examples of such devices include personal computing devices, mobile computing devices, and network cloud-based virtual or real devices.

Another aspect of some embodiments of the invention is the User Network Identifier Service (UNIS). A UNIS enables and controls the provisioning of the user prefix and the User Network Identifier IP Addresses (UNI-IP) in accordance with the policies of the Provisioning Service organization. In some embodiments this service may include an Internet server component. A component of the UNIS may operate on the device or virtual machine device such that it is able to install the IP address and set up a Tunnel Router.

Some embodiments of the invention incorporate concepts of the prior art "map and en-cap" protocols such as that used in Locator/ID Separation Protocol (LISP) to define a dual addressing structure for each Device component. The outer address, the Routing Locator (RLOC), is used to route the network packets. The inner address, the endpoint identifier (EID), is used to identify the endpoint device or virtual machine device.

In some embodiments, the invention provides for an identifier that can be uniquely associated with each device and can be used to locate each device on the network, even if the network address of the device changes from time to time.

Another aspect of some embodiments pertain to the inclusion of one or more tethered devices within the User Network such that each tethered device acquires a UNI-IP address and becomes part of the same local IPv6 network dedicated to the user. This is achieved without installing additional software components on the tethered device and uses the tethering device to provide the registration and tunneling functions taught in this disclosure.

Other additional objects, features, and advantages of the invention are described in the detailed description, figures, and claims. Both the foregoing general description and the following detailed description are exemplary and explanatory, and are not intended to be limiting as to the scope of the invention.

DESCRIPTION OF FIGURES

In order that the present invention is better understood, embodiments of the invention will now be described, by way of example only, with reference to the accompanying drawings in which like reference numerals may be used to denote like parts.

FIGS. 5A, 5B, and 5C illustrate example database structures according to some embodiments of the invention.

FIG. 9 shows some User Interface screens for device registration that may be presented to the user in some embodiments of the invention

FIG. 14 is a block diagram of an illustrative computing system suitable for implementing an embodiment of the present invention.

DETAILED DESCRIPTION

Figure 1:
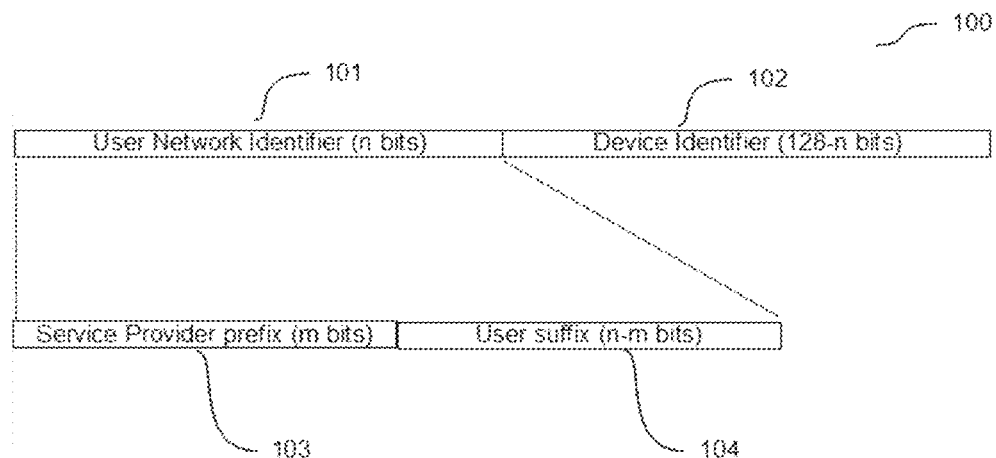
FIG. 1 shows the composition of an UNI-IP address according to some embodiments of the invention.

The invention provides a method and mechanism for associating a number of computing devices with a particular user. A network capability is established for the associated devices, to implement management and control functionality which enables the devices, running on different, physically distributed hardware, to interwork securely and privately as if they were directly connected on a local IPv6 network dedicated to the user. According to some embodiments, the invention is implemented by defining dual addressing structures for the devices, e.g., using the Locator/ID Separation Protocol (LISP) to define a dual addressing structure for each device component.

To explain the embodiments of the invention, the following disclosure is illustratively described with respect to specific example protocols and address formats, such as the LISP protocol. It is noted, however, that the invention is not limited to these example protocols. In addition, the invention is illustratively described with respect to the term "user", which refers to any entity or groups of entities. Thus, while specific examples may provide a context in which the term "user" refers to a person using a device or an operational association of devices, the term "user" may also refer to other types of entities or groups in other contexts, e.g., to refer to a logical association, or group, of members, such as a family household. The "user" term may also refer to a software agent application that interacts with a device or an operational association of devices. Likewise, the term "device" is used in an illustrative capacity in this disclosure, and may refer to any type of device for which an address is utilized, such as for example, personal computing devices, mobile computing devices and network cloud-based virtual or real devices.

In some embodiments, the Locator/ID Separation Protocol (LISP) is used to define a dual addressing structure for each device that is associated with a user. The outer address, the Routing Locator (RLOC), is used to route the network packets. The inner address, the endpoint identifier (EID), is used to identify the endpoint device or virtual machine device.

According to some embodiments, the Routing Locator (RLOC) IP address is the network address assigned by the local subnet. This corresponds to the real IP Address of the device in terms of the current technology. Note that there can be more than one RLOC address in the case that the device is connected to more than one subnet, which can happen, for example, if the device is multi-homed or is transitioning from one subnet to another. The one or more RLOCs may be IPv4 addresses, IPv6 addresses, one or more other types of addresses, and/or any combination thereof.

The outer protocol is IP-based in the preferred embodiment. However, other protocols may be used in place of the outer IP protocol for networks where these other protocols are available. For example, the Multi-protocol Label Switching (MPLS) network may be used, where the Label Header may be used as a substitution for the RLOC address taught in this disclosure. This approach illustrates that the LISP protocol is not the only protocol that can be used in some embodiments of the invention, and other protocols (such as MPLS) may be used instead of LISP to perform encapsulation with the outer protocol.

The Endpoint Identifier (EID) IP Address will be assigned with special characteristics in accordance with some embodiments of this invention and will be known as the User Network Identifier IP Address (UNI-IP). This address may be used by applications to communicate across the Internet. A device needs only one UNI-IP to satisfy this invention, but there may be occasions where more than one UNI-IP is advantageous, such as when the device operates in more than one role, for example a business role and a personal role. The UNI-IP will be an IPv6 address in this embodiment. Preferably, a UNI-IP will be a global unicast addresses but local addresses may also be used. Because the UNI-IP addresses are associated with users, they may also be used to route and allow access for messages on a per-user basis in a very efficient manner.

When a device or virtual machine device (which may be collectively referred to herein as "device") receives a new UNI-IP address or a new RLOC, it will register this new address with a network service, for example by using a Map Server as specified by the LISP.

The device or virtual machine device will communicate with a Tunnel Router (xTR), which will intercept all outgoing IPv6 packets with the UNI-IP as source address and encapsulate them using a header with RLOC as the source address. It is noted that there are now inner and outer addresses in this embodiment. In one embodiment the xTR may be part of the said device, or it may be on another device, such as a router, as part of the local network connected to the device. In the tethering situation (as described in more detail below), a tethered device is an example of a device where the xTR may be on a different device separate from the tethered device.

The xTR will attempt to resolve the destination device address to obtain the destination RLOC address to be used in the outgoing packet by first using its device cache of such addresses, and if not found, then use the network device resolver, which may be associated with one or more device map servers, to determine whether the destination address is also a known device UNI-IP. If it is, then the packet will be encapsulated with the appropriate IP header and sent to the discovered destination RLOC. If not, and provided the UNI-IP is a global unique address, then it will be encapsulated and sent to a known Device Proxy Tunnel Router (DPTR) for routing to the Internet using IPv6.

Incoming packets to the device appear at the xTR and will be examined for the presence of the encapsulated header. If present, the outer header of the message will be stripped off and the source address UNI-IP and RLOC may be added or refreshed into the device cache.

Device-to-device communication where both sender and receiver are associated with the same user will make use of the message tunnel. For device-to-computer communication where the computer is not associated with the user network, use will be made of the DPTR for both incoming and outgoing messages using only IPv6. Normal IP rules apply and therefore global unicast UNI-IP addresses may communicate with any computer on the Internet whereas local unique UNI-IP addresses will be restricted to computers on the local network associated with the DPTR.

In one aspect of some embodiments of the invention, the user device or virtual machine device may contact a UNIS service to obtain first a user network prefix and then a UNI-IP address. A secure, encrypted protocol with authentication may be used for this operation, for example TLS (Transport Layer Security) or SSL (Secure Sockets Layer) may be used. The UNI-IP may be made up of the user network prefix and the device identifier. FIG. 1 shows the composition of an example UNI-IP address 100. This includes the user-specific prefix 101 and the device identifier 102. The user-specific prefix further comprises a user network prefix 103 which may be a global network unicast prefix such as may be issued by an Internet Service Provider (ISP), or it may be a local network address, such as a site-local unicast address, and user suffix 104 that uniquely identifies the user within the subnetwork. Both global and local addresses may be used for communication between user network devices.

Figure 2:
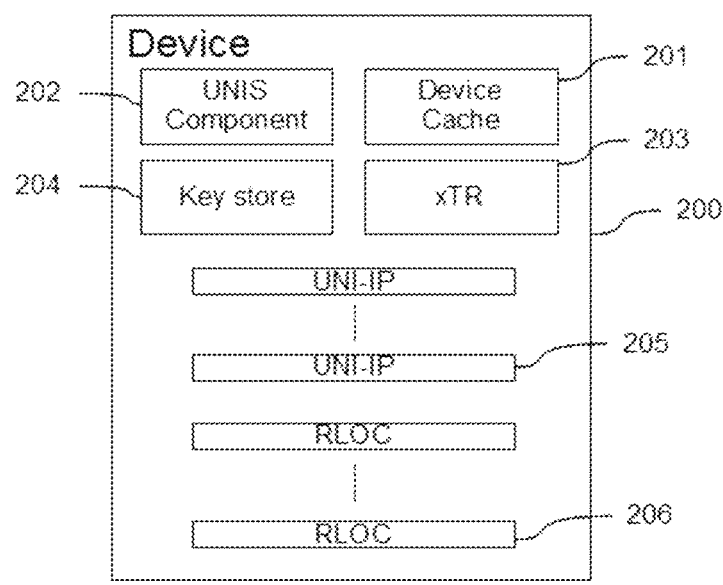
FIG. 2 shows the components installed in a computing device according to some embodiments of the invention.

All devices associated with the same user will have UNI-IP addresses that contain the same user network prefix. The UNIS will provide unique UNI-IP addresses for each device registered by the user. FIG. 2 shows the components installed in the computing device 200, including the UNIS runtime component 202, the Tunnel Router 203, the address cache 201, the secret key store 204 the UNI-IP addresses 205 and the routable addresses 206.

Figure 3:
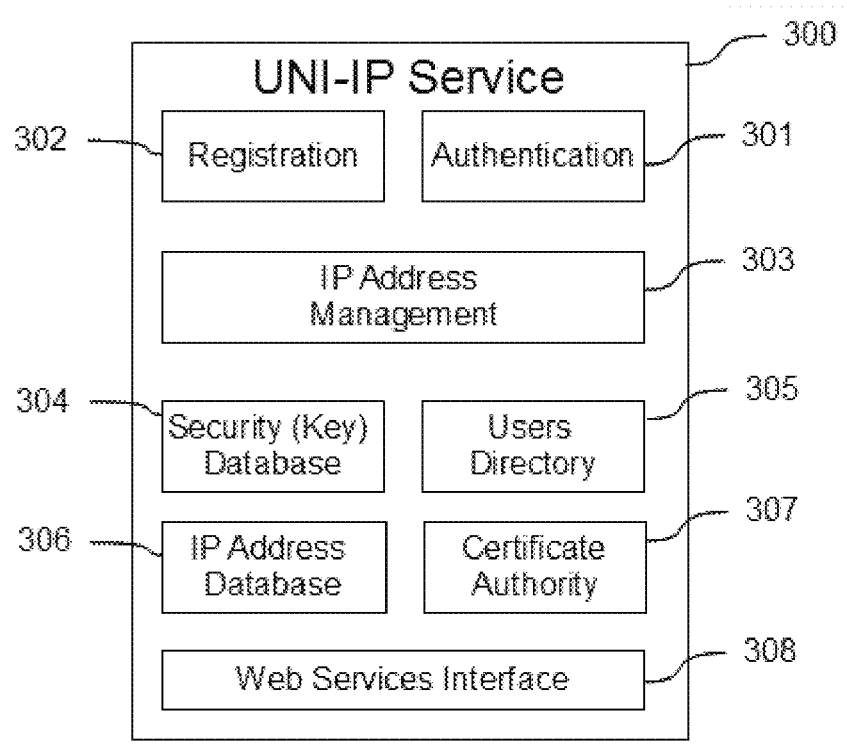
FIG. 3 shows the components associated with the UNI-IP Provider Service.

Another aspect of some embodiments of the invention is the User Network Identifier Service (UNIS) server 300 shown in FIG. 3. Interaction with the UNIS server may, in one embodiment, be via a network interface such as a Web Services Interface 308. The UNIS server includes a user directory 305 and user authentication 301 to control access to the UNIS service. IP Address Management 303 enables and controls the provisioning of the user prefix and the user IP addresses, in accordance with the policies of the Provisioning Service organization. IP Addresses are stored in the IP Address Database 306. A registration component 302 of the UNIS server operates in communication with the user device such that it is able to install the IP address and set up the Tunnel Router.

Figure 4:
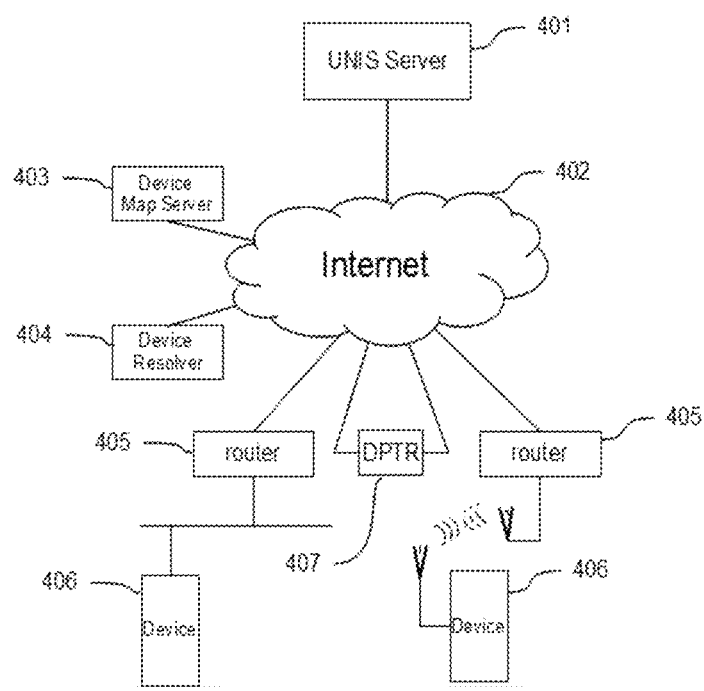
FIG. 4 shows the network components of a system according to some embodiments of the invention.

FIG. 4 shows the network components of the system including the UNIS Server 401/300, Device Map Server 403, Devices 406/200, Routers 405, Device Resolver 404 and Device Proxy Tunnel Router 407. In operation, an RLOC address 206 of the computing device may be registered/updated with the Device Map Server 403 every time the address is added, updated, deprecated or deleted. In the preferred embodiment, the Device Map Server 403 and the Device Resolver 404 are High Availability network servers. In an alternative embodiment, the Device Map Server 403 and the Device Resolver 404 may be distributed over a plurality of cooperating network servers to provide improved response times and increased reliability.

Figure 5B:
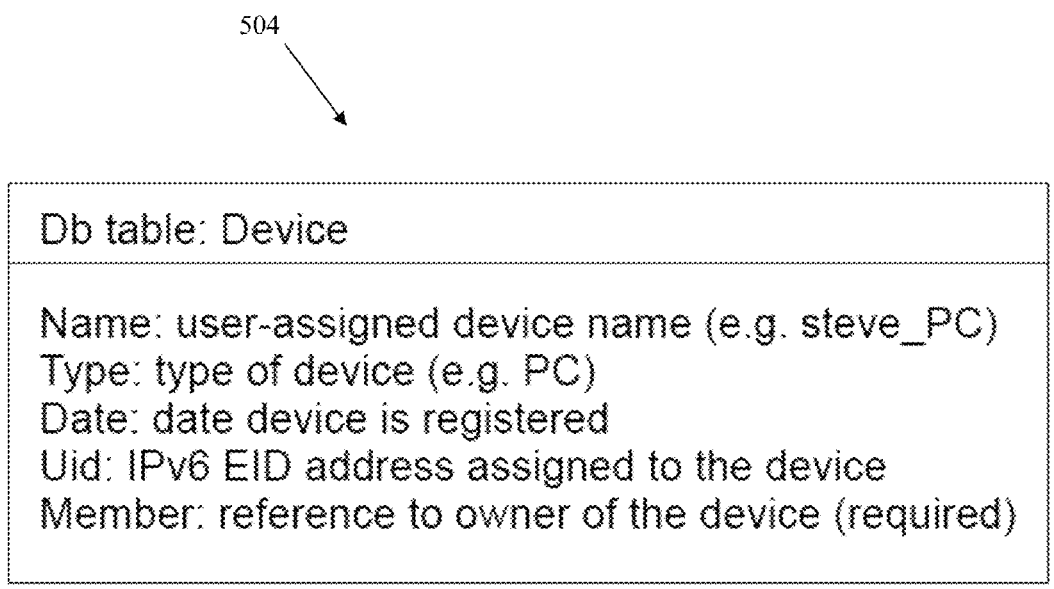

As noted above, the UNIS server may interact with one or more databases to maintain information used by the server. FIGS. 5A-C illustrate example database structures that can be employed in some embodiments of the invention.

FIG. 5A shows the schema 502 of a "Member" table that includes information pertaining to members/users in the system. This table includes, for example, information pertaining to the user's username, full name, password, user ID, telephone number, location, email address, and/or IPv6 prefix assigned by the server.

FIG. 5B shows the schema 504 of a "Device" table that includes information pertaining to devices in the system. This table includes, for example, information pertaining to the device's user assigned name, device type, device registration date, user/owner of the device, and/or the IPv6 EID address assigned to the device.

FIG. 5C shows the schema 506 of a "System" table that includes information pertaining to the system itself. This table includes, for example, information pertaining to the IPv6 prefix, provider prefix length, and/or organization name for the system.

In another aspect of an embodiment, the UNIS will cause the device to generate security encryption keys, certificates and shared secrets for use in secure communications protocols, such as IPSec and TLS. The UNIS server will sign such keys, where necessary, and act as the Certificate Authority 307 for the device or virtual machine device.

In yet another aspect of an embodiment, the device or virtual machine device may periodically and/or when necessary reconnect to the UNIS server in order to renew its security keys. This activity may occur when half of the security key lifetime has been reached. Hence the device may be provisioned with more than one set of valid security keys so that key-rollover may occur without interrupting operations.

In yet another aspect of an embodiment, the device may be provisioned, for example, with cryptographically generated addresses that require the device to update its UNI-IP addresses at the same time as its security keys. In this case there may be more than one valid UNI-IP address for a period of time.

In yet another aspect of an embodiment, the UNIS may associate a domain name with the particular user and a host name with the UNI-IP address of the Device. Upon registration and provisioning of the device, the host name will be made active in the Domain Name System. In one embodiment of the invention, the host name of the device may be a sub-domain of the user domain.

Another aspect of an embodiment is user multicast capability. The purpose of the multicast capability is to send a message to every device that is associated with the user. Because at least some of the devices will be on different subnets, the multicast will involve additional steps. The initial IPv6 link-local multicast message will be intercepted by the local Tunnel Router (xTR) on the device. The xTR will use its internal device cache and may also request the external device resolver to obtain a list of all user devices. Then it will send the encapsulated multicast message to each device. Optimizations may be possible for devices on the same subnet, such as sending a real multicast message.

Figure 6:
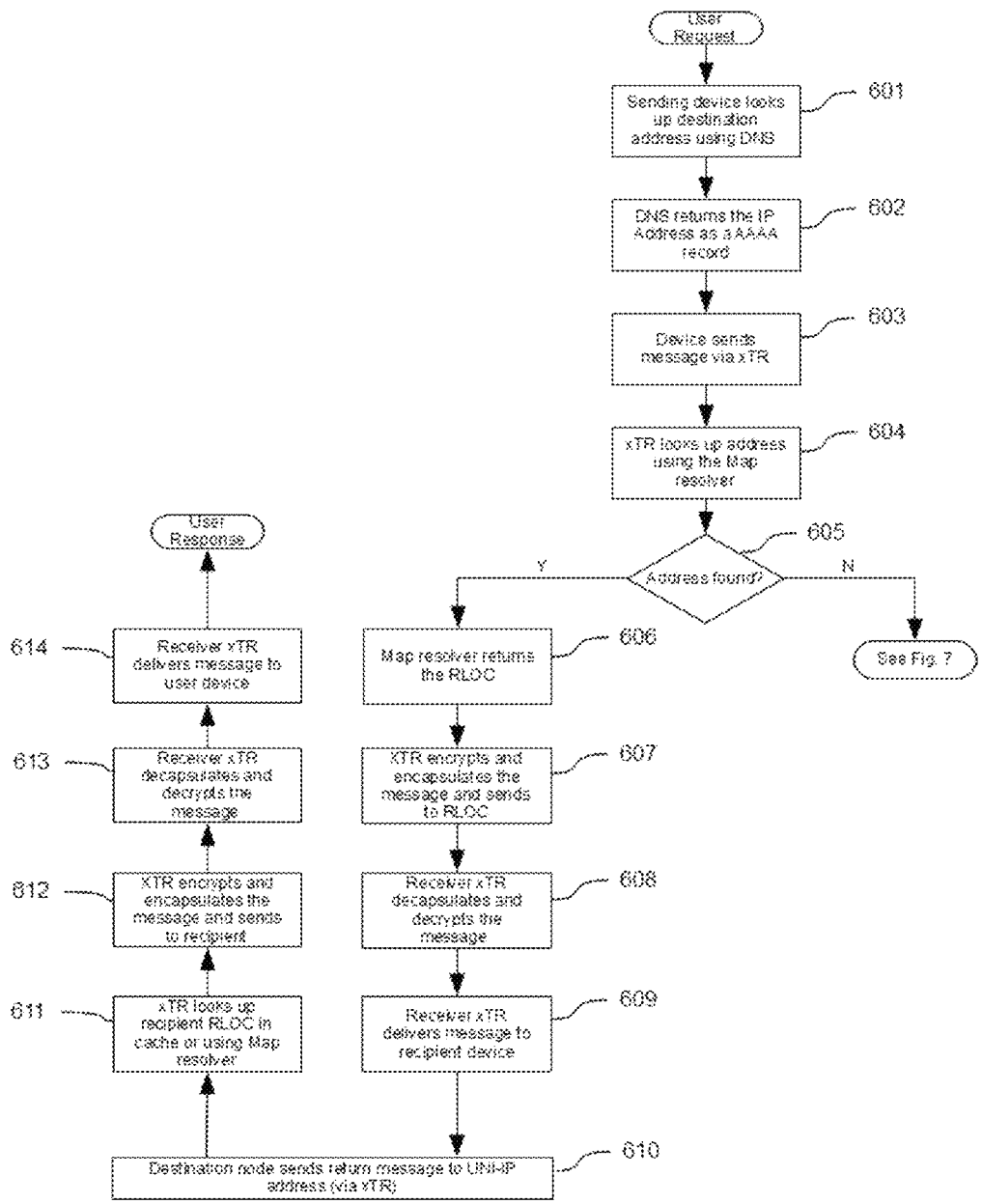
FIG. 6 shows the logical flow when a message is sent from a UNI-IP User Device to another UNI-IP User Device.
Figure 7:
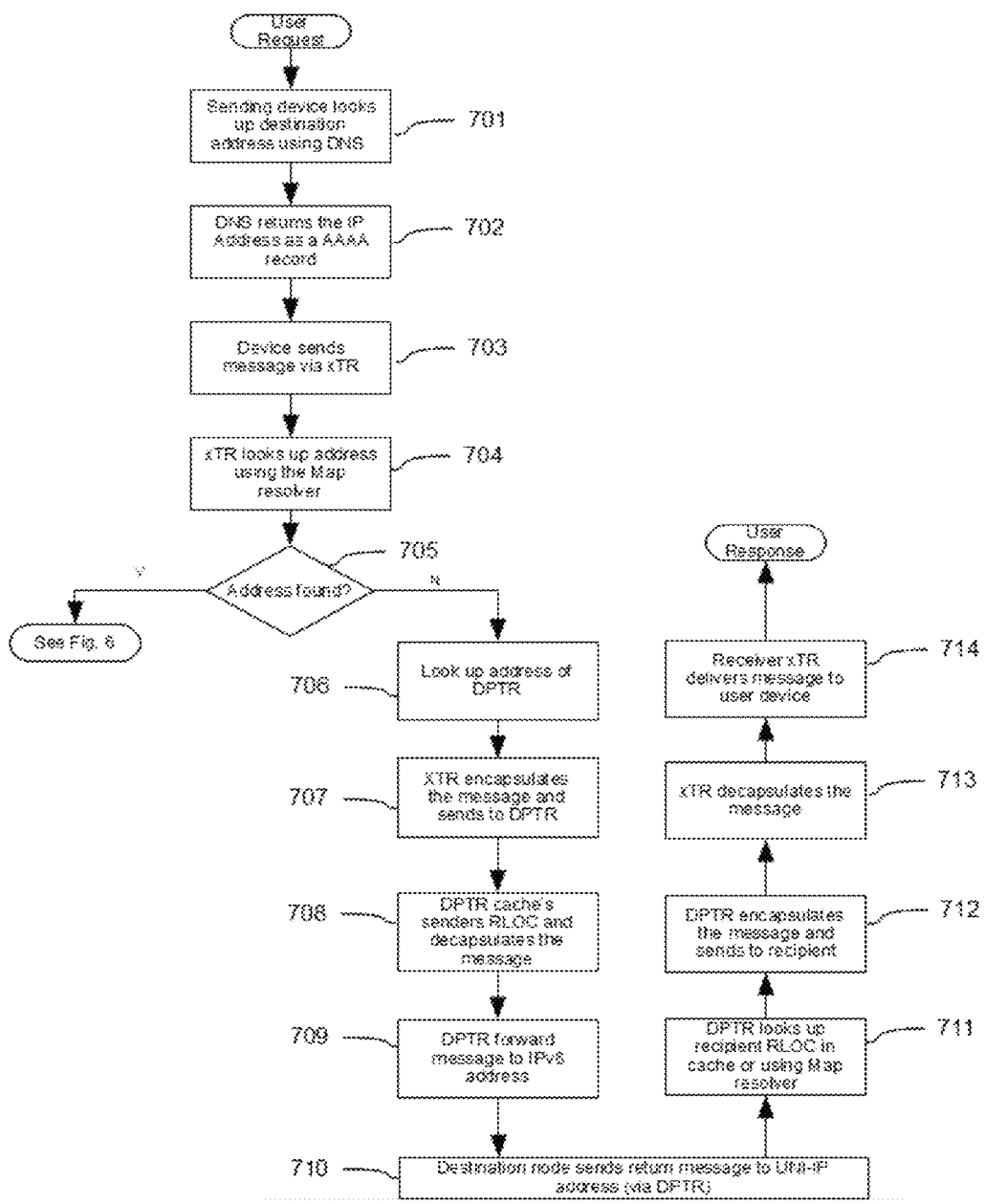
FIG. 7 shows the logical flow when a message is sent from a UNI-IP User Device to an IPv6 recipient on the Internet who is not part of the User network.

Further details about the above components are described below with respect to the explanation of FIGS. 6-8.

Figure 8:
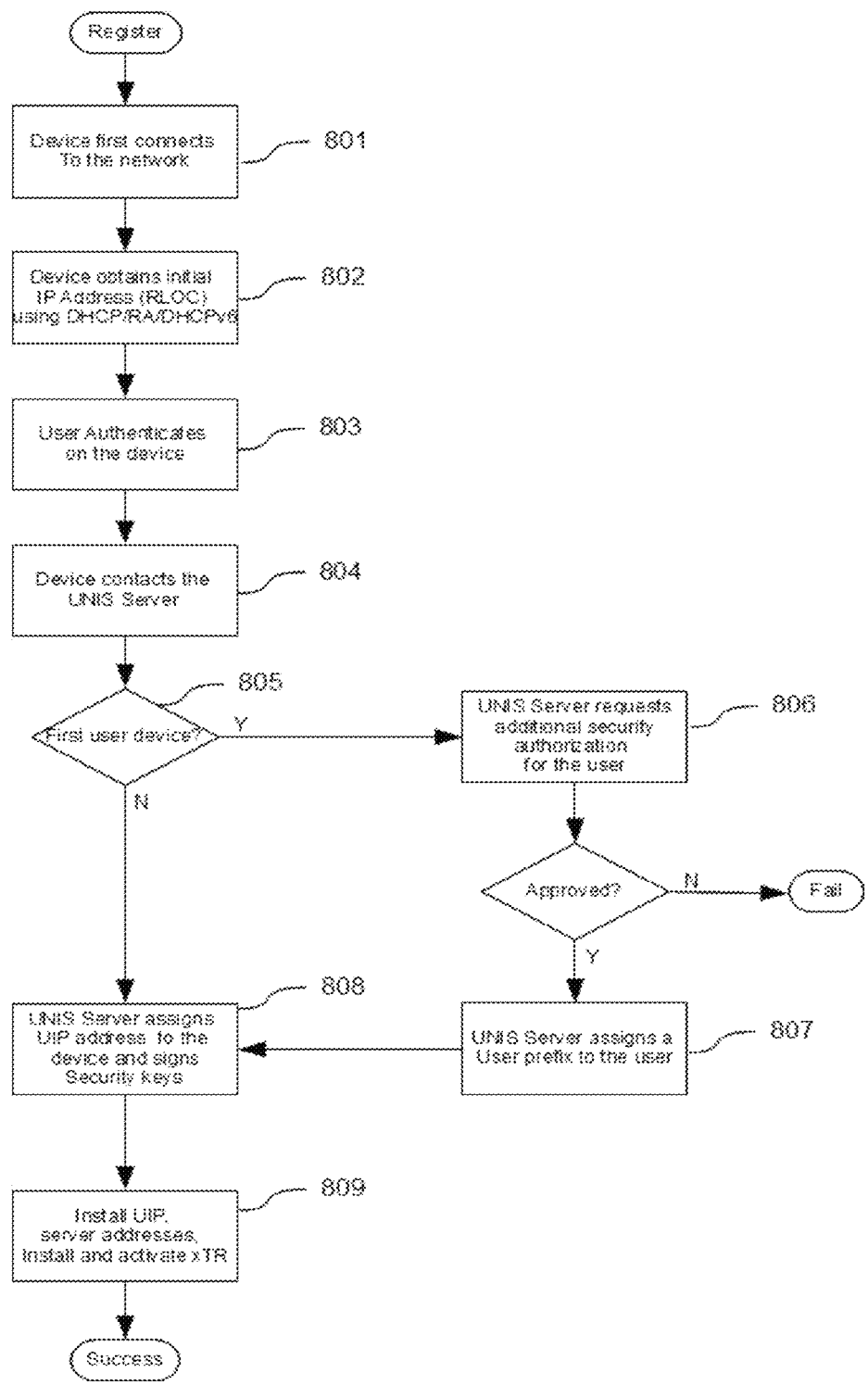
FIG. 8 shows the logical flow for registering a User Device according to some embodiments of the invention
Figure 9:
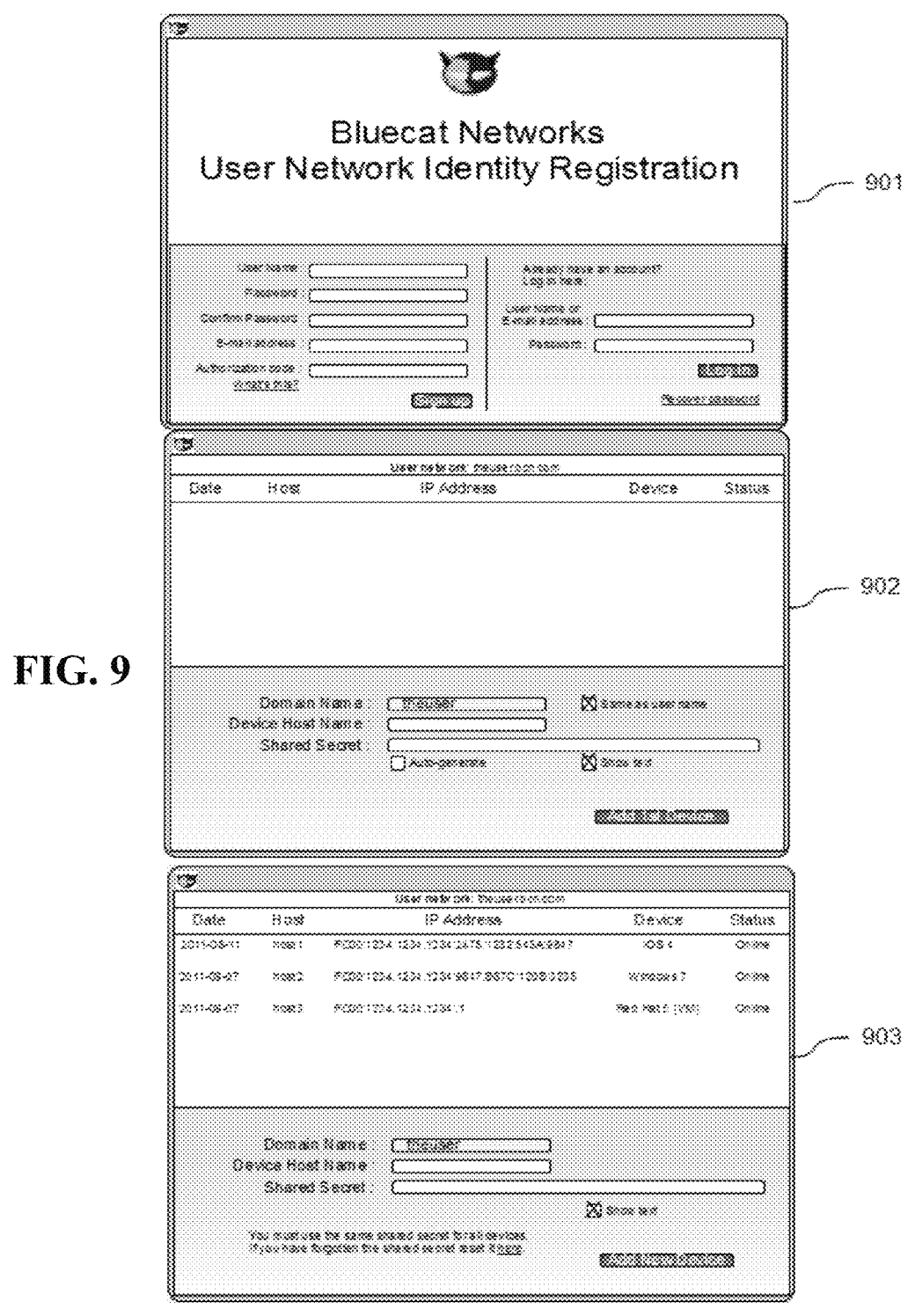
Figure 10:
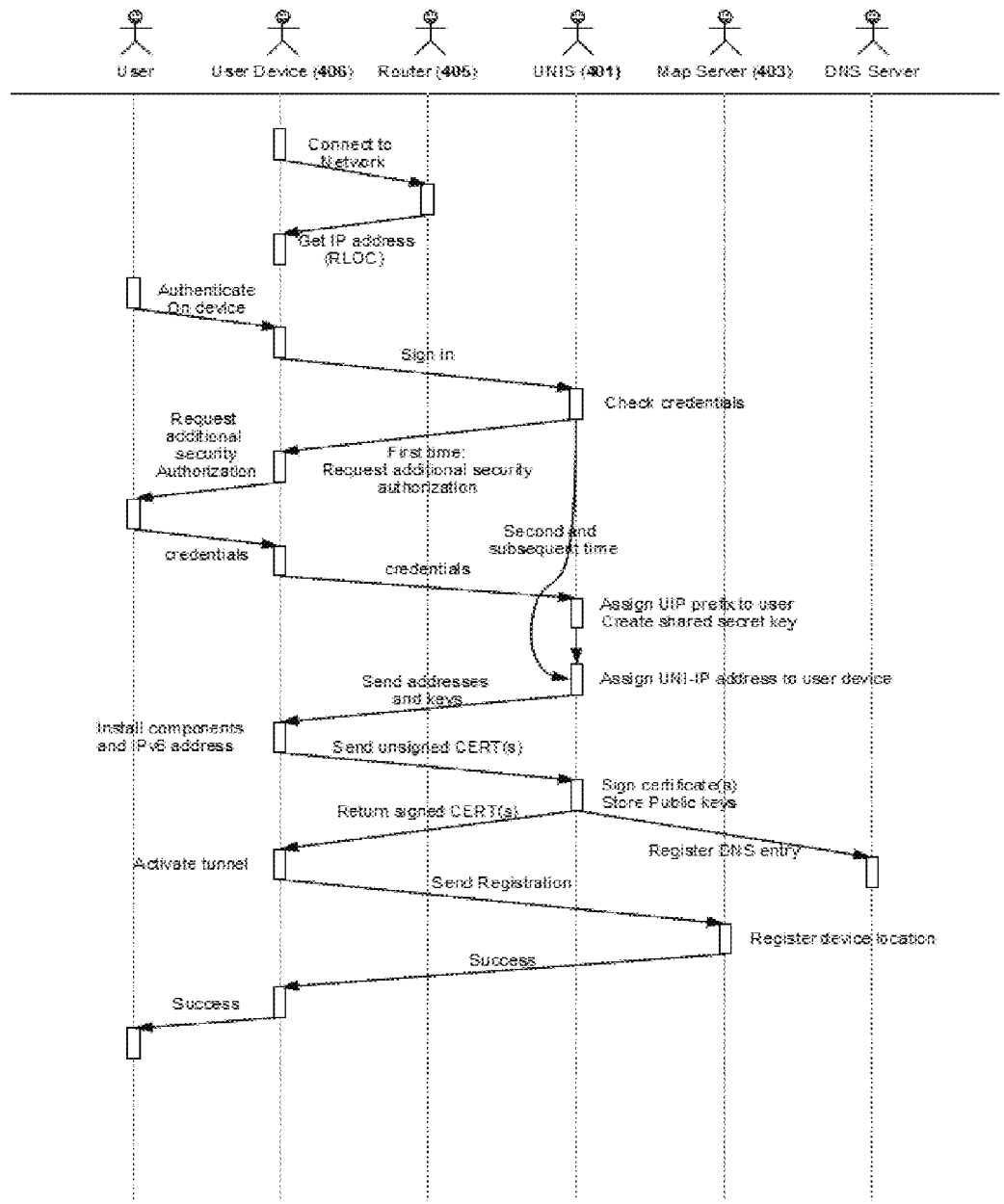
FIG. 10 shows a sequence diagram representation of FIG. 8.

FIG. 8 shows the logical flow for provisioning a device. FIG. 10 shows a sequence diagram representation of the steps in FIG. 8. Prior to configuring the user device in accordance with some embodiments of the invention, the user account is set up on the UNIS server. FIG. 9 shows one exemplary embodiment of user interface screens that may be used in registration.

The following information may be set up by means of UNIS Registration 302 and stored in the Users Directory 305, including some or all of, but not limited to;
User Identifier
User Name
User Organization
User Home Location
User Role(s)
Authentication Credentials: can take the form of a password, secret token, personal question/answer or a combination of these.
Device type enabling In an alternative embodiment, the user setup may be self-administered, in which case the user information will be entered by the user during the provisioning method 804 described below.

Referring to FIGS. 8 and 10, the device will connect to the communications network 801 and will acquire an IP address compatible with the local network using well-known techniques, such as using DHCP 802. This IP Address may be an IPv4 Address or IPv6 address and is termed the Routing Locator Address (RLOC). The device must be connected to the Internet to commence provisioning and the user must log into the device 803 to gain administrator access to the device.

Once logged in the user will commence provisioning the device by executing the User Network Identifier Service (UNIS) provisioning application. In one embodiment the UNIS provisioning application will be downloaded from the UNIS server if it is not already installed. The UNIS provisioning application will interact with the UNIS server interface 308 over the network and in one embodiment will utilize a secure Web Services protocol to effect the interchange of provisioning information 804. Provisioning may be carried out using either an IPv4 or IPv6 network.

If this is the first device to be set up by the user, then the user may be required to authenticate with the UNIS server by entering a valid username and password 805 (screen 901). In an alternative embodiment, a new user will choose to create a new account and enter the required information fields. The UNIS provisioning application will generate a unique user-prefix of preferably 64 bits in length. This user-prefix may include the service provider prefix, such as an IPv6/48 prefix, assigned to the UNIS system by the Internet Service Provider (ISP) 807 and managed using the IP Address Management 303. (This prefix is also important because, in order to receive messages on the global Internet, this prefix is set to route to the DPTR 407 in FIG. 4). The user-prefix may optionally also include a marker indicating that this is a user-prefix, such as a predetermined code in the most significant bits or some other form of identification. In addition, the UNIS provisioning application may optionally generate a secret user key for use by the devices or it may be entered by the user (screen 902). This may be securely stored in the UNIS server Security Database 304.

For an existing user for which one or more devices are already provisioned, the UNIS server may retrieve the user-prefix from the Users Directory 305. Users will be able to manage their devices using the same application (screen 903).

The UNIS provisioning application may perform the following at 806: (a) Generate a preferably 64 bit Device-identifier for this computer. To do this it may, as an example, use the User-prefix, year-month-day, and device counter for this user to seed a randomizing function. The device-identifier may optionally include a marker indicating that this is a device-identifier, such as a predetermined code in the most significant bits or some other form of indication. The resulting UNI-IP address will be installed in the device and also sent to the UNIS server 300 for storage in the IP address Database 306. (b) Retrieve the secret user key and save it in the key store 204. (c) Generate a TLS certificate in the device, save the private key in the device key store 204, send the certificate to be signed by the UNIS server and install a copy of the certificate in the device key store 204. The UNIS server will be the Certificate Authority for this certificate. (d) Create a public/private key pair for IPSec in the computer and send a copy of the public key to the UNIS server. Optionally, the one or more keys may also be deployed to a DNS server for the user associated with the UNI-IP address. In some embodiments, the above process may further include setting up the routing tables based on source addresses.

UNIS provisioning application will install the appropriate Tunnel Router 203 and the UNIS client software 202 for this device, which may be downloaded from the UNIS Service Internet site, if they are not already installed. Finally the UNIS provisioning application will set the necessary server addresses for: Device Map Server, Device Resolver, DPTR and activate the UNIS runtime component and Tunnel Router 808. Once provisioning is complete the UNIS provisioning application will terminate.

Revalidation will be performed in some embodiments of the invention. From time to time, updates will be required to the certificates and revalidation of the UNI-IP may be needed. The UNIS runtime component 202 may do this automatically or in response to a user initiation. As long as the current certificates are valid and not revoked there may be no need for human interaction to perform revalidation.

The UNI-IP address installed on the user device 200 is available for use in the same way as any other IP Address is used. This address may be used by applications running on the computer as the source address for any outgoing IPv6 communication packet. Messages generated using the UNI-IP 205 as source address will be intercepted by the tunnel router (xTR) 203. This is described for the cases below.

Figure 11:
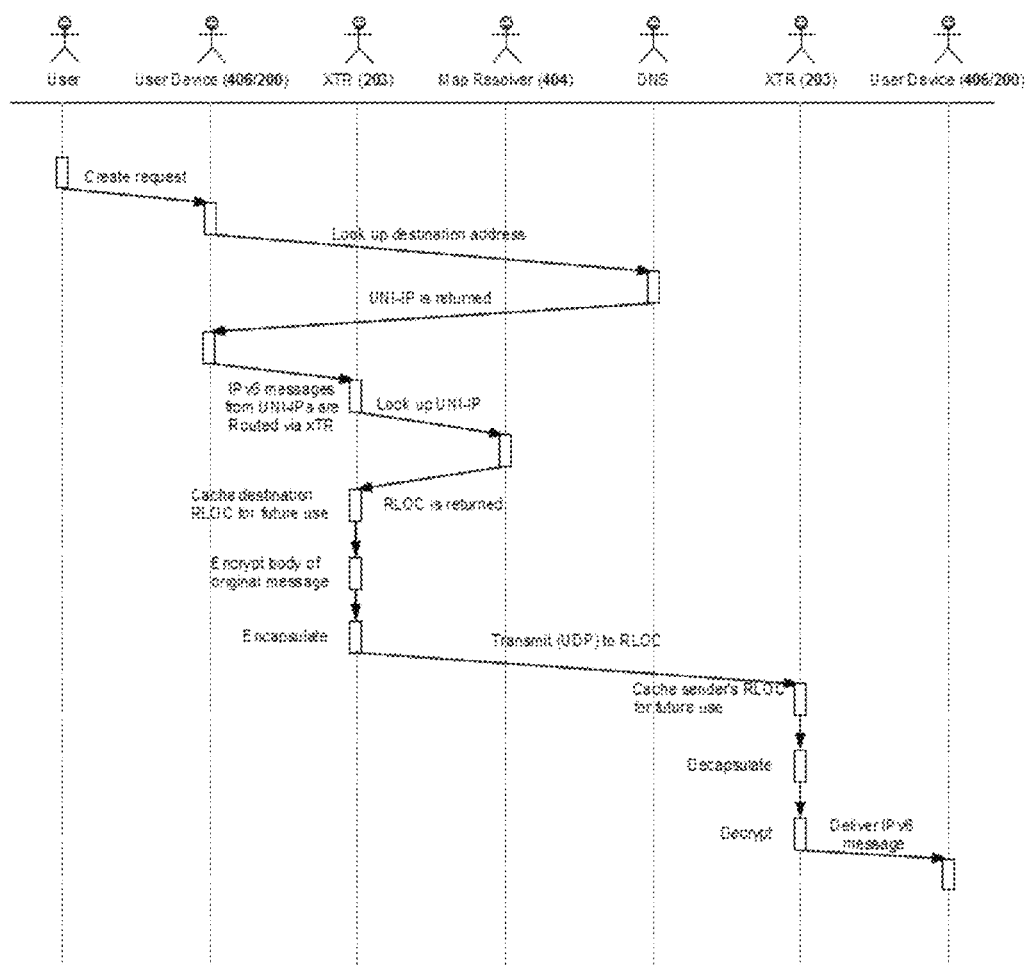
FIG. 11 shows a sequence diagram representation of FIG. 6.

For user-to-user communications case, communications with other devices associated with the same user will make use of the UNI-IP destination addresses of these devices. The user-to-user communications case is described in FIG. 6. FIG. 11 shows a sequence diagram representation of the steps described in FIG. 6.

Devices will use DNS (601) to obtain the destination IPv6 address (602) and send a message via the tunnel router (603). The tunnel router will find the RLOC address corresponding to the destination address by looking it up, first in its local device cache and, if not found, by issuing a network request to the network Device Resolver (604). For a user-to-user message the destination addresses will have the same address prefix as the user device and will be resolved successfully (605). The map resolver returns the RLOC at 606. Once found, the tunnel router will encrypt and encapsulate the message (607) and send it to the RLOC address of the destination device where it will be received, decapsulated and decrypted by the tunnel router of that device (609) and delivered.

The source address of the outer, encapsulated message will be the RLOC of the sender tunnel router and will be cached for future use, such as the message response (610 to 614). At 610, the destination node sends the return message to UNI-IP address, e.g., via xTR. At 611, the xTR looks up the recipient RLOC, e.g., in cache or using a map resolver. At 612, the xTR encrypts and encapsulates the message and send it to the recipient. At 613, the receiver xTR decapsulates and decrypts the message. At 614, the receiver xTR delivers the message to the user device. It is noted that encryption of the tunneled data is optional in some embodiments because encryption may already be included through the use of IPSec at the UNI-IP level.

User-multicast messages will follow the normal protocol for link-local multicast messages. If the tunnel router intercepts a message that has a multicast destination address and the UNI-IP as a source address, then it will encapsulate and route the message to each and every RLOC address for that user. The list of user devices may be obtained from the device cache 201 as well as from the device map server 403. In some embodiments, the tunnel router may use local multicast or broadcast mechanisms for devices on the same subnet as the user device.

IPSec is inherent to IPv6. In the preferred embodiment of this invention, a secret key may be provisioned in the device key store 204 by the UNIS provisioning service on every device associated with the user. This secret key may be used to configure the IPSec for authenticated and optionally encrypted communications. In an alternate embodiment, public/private keys may be configured for IPSec, and other approaches for sharing public keys, such as DNS, may be employed.

For the user-to-different-user communications case, the computer device 406 may send messages to devices associated with other users using the UNI-IP addresses of said users. The resolution of these addresses may include the tunnel router querying the network device resolver to determine (a) if these addresses are UNI-IP addresses and (b) what the RLOC addresses of the corresponding devices currently are. IPSec may be used between such devices provided they are provisioned and configured with secret keys. Operation is possible in the presence of Network address Translation (NAT) using any suitable approach, such as for example, LISP-based NAT traversal.

Figure 12:
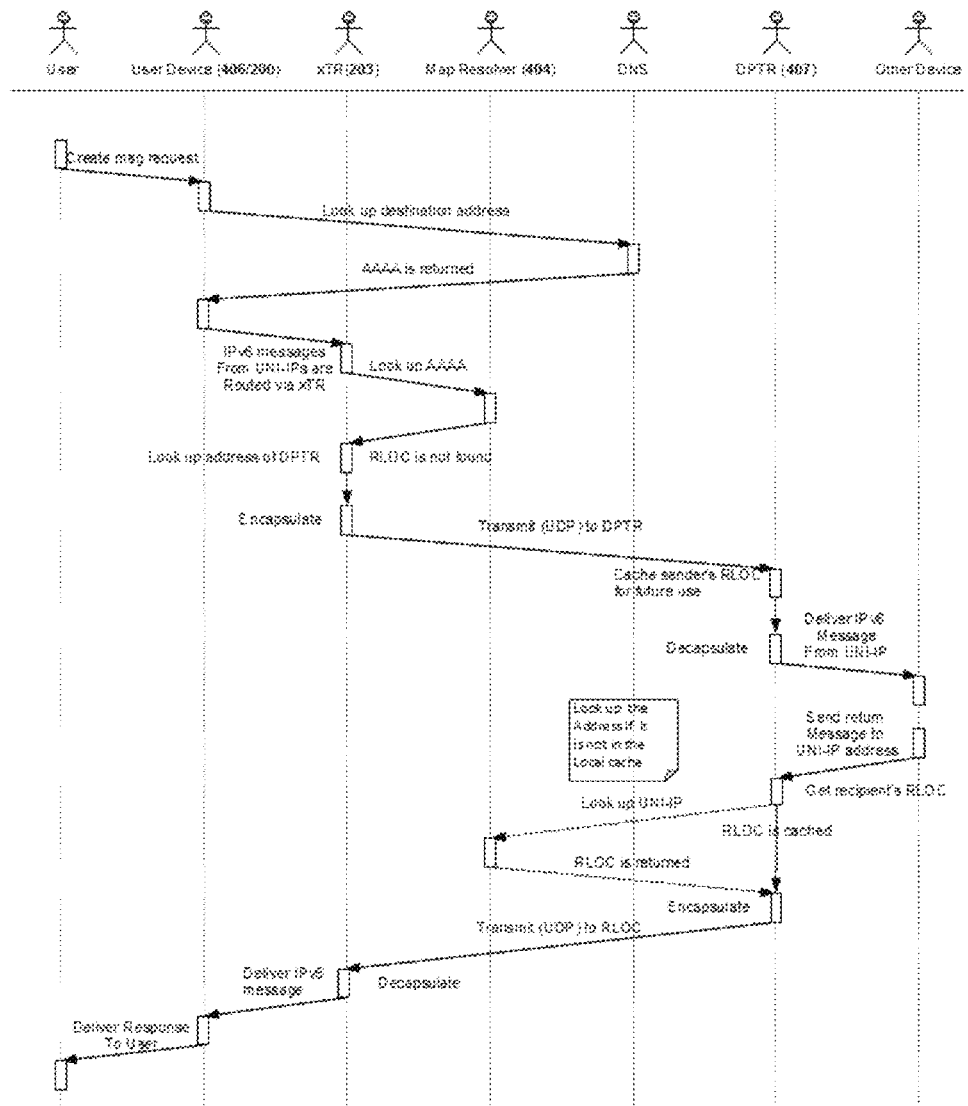
FIG. 12 shows a sequence diagram representation of FIG. 7.

For the user-to-internet communications case, the communication with servers and other Internet devices using IPv6 addressing is achieved by means of the Device Proxy Tunnel Router (DPTR) 407. The user-to-internet communications case is illustrated in FIG. 7. FIG. 12 shows a sequence diagram representation of FIG. 7.

Outgoing messages addressed to IPv6 destinations will perform steps 701 to 704, which perform similarly as described above with respect to the initial steps of FIG. 6, but in some cases may be found to fail (705). Since the IPv6 destinations are not known to the Device Resolver 404 they may be routed from the tunnel router 203 to the DPTR 407 as encapsulated messages over the IPv4 or the IPv6 network (706, 707), the DPTR may remove the encapsulated message (708) and forward the original messages to their destination as native IPv6 messages (709).

An incoming message originating on the IPv6 Internet addressed, such as a response to the previous message, to the UNI-IP address of the said user may be routed to the said DPTR (710) whereby the DPTR may obtain the RLOC of the destination device (711) by means of the device resolver whereby it may be encapsulated and forwarded to the destination device over the IPv4 or the IPv6 network (712). The destination tunnel router will de-capsulate (713) and deliver the message (714) to the IPv6 addressed device.

For the user-to-LISP communications case, compatibility with the LISP network is intended such that the Device Resolver 404 may be able to determine, by means of an interface, RLOC addresses for computers associated with other LISP systems. It may therefore be possible to exchange messages with these computers using the LISP encapsulation technology.

If the user logs off the device, the UNI-IP address may be uninstalled and the tunnel router may cease to operate.

Embodiments of the invention are applicable to any suitable application. For example, the invention may be applied to facilitate "tethering," which is a common practice used to connect devices, such as mobile smartphones, to a network through other, existing devices using one of a variety of different connection methods. This enables the tethered device to utilize the same network access as the host tether device.

Some embodiments pertain to an approach that enables tethered devices to become part of the user network described herein. In this approach, UN-IP applies to a device as a node but the device can just as easily be used as a network router within the assigned user network. Hence one can use the device to extend the user network to other devices associated with the user. This is useful in the case of tethering for attaching devices that would otherwise not have network access. Connectivity with tethering is often provided using WIFI (IEEE 802.11x), but other wireless or wired forms may be used such as, but not limited to, Bluetooth, USB, serial point-to-point (RS232) and Infra-red communications. Typically such tethered devices would have access only to the local network, but by using the existing user device to extend the user network instead of the local network of the tether device to the tethered device a special trust relationship is created between existing user devices and the tethered device.

Figure 13:
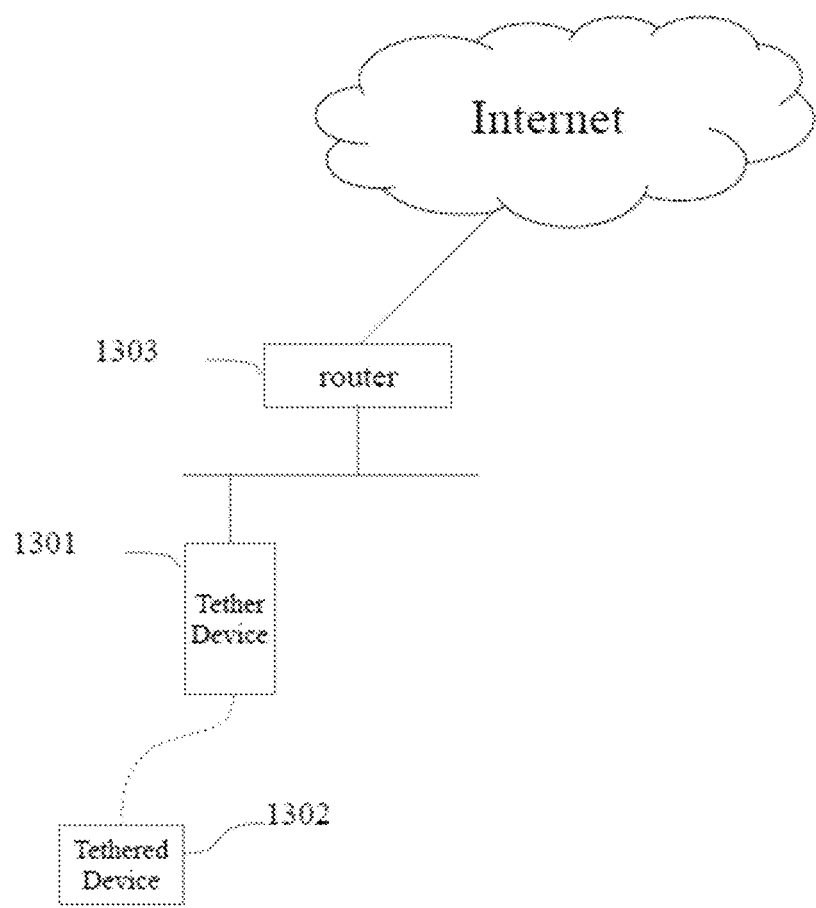
FIG. 13 illustrates an embodiment of the invention applied to tethering.

FIG. 13 shows the tether device 1301 acting as a tunnel router to the tethered device 1302 and performing the operations of; obtaining the tethered device a unique IPv6 network address within the personal subnet of the user, registering the new address with the map server, and encapsulating/decapsulating communications with the user network and the tethered device. This address may be deployed to the tethered device, for example using the standard DHCPv6 protocol.

The use of standard protocols, such as DHCPv6, in the tethered device is preferred as it allows the said device to function without requiring special software installation. In order that security of the network is maintained, some embodiments require that the tethered device 1302 provide at least one level of secure authentication to the network and in some embodiments, encrypted communications may be required as well. This may take the form of a secure wireless protocol between the two devices, such as WPA2. Alternatively, it may be embodied in the use of a secure protocol native to the IPv6 network, such as IPsec. In yet another alternative, higher level security may be enforced by the tether device 1301 by only permitting communications using mechanisms such as TLS and HTTPS.

Therefore, what has been described is an improved management system and method for provisioning user network identity addresses. The embodiments of the invention enables related devices running on different, physically distributed hardware, to interwork securely and privately.

There are numerous advantages provided by the various embodiments of the invention. For example, the present approach allows for easy and efficient registration, authentication, and configuration of devices, as well as similarly easy and efficiency de-registration of the devices from a central location. Moreover, the various embodiments provide a transition path and approach for using IPv6 addressing.

The user-specific static IP address also supports and provides many advantages. For example, the user-specific static IP address supports IPSec security over unsecured IPv4 network, stable DNS entries, including public keys, inbound connectivity (reachability), and user-specific access and routing control based on IP address.

As discussed above, some embodiments employ protocols such as LISP. The benefits of such approaches include, for example, being able to provide a replacement for Virtual Private Networks (VPNs), multi-homing, mobility without loss of connectivity, virtual machine (VM) mobility, and transitioning to IPv6 networking.

In the preferred embodiment of the invention a user computing device is described. It should be clear that this device may be one of a number of alternatives including, but not limited to, a laptop computer, a tablet, a desktop computer, a smartphone, a gaming computer, a navigation computer or a virtualized computer. A non-specialized device, such as for example, a personal tablet or smartphone device may be provisioned with a specialized identity on a temporary or permanent basis, such as a corporate identity, for use when interacting with similarly provisioned devices so that additional capabilities and security may be enabled.

FIG. 14 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., wireless or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. Data may be accessed via a data interface 1433 in a database 1432 within a tangible storage medium 1431.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

The invention claimed is:

1. A method for setting up a user-specific IP address at a computing device, comprising:

obtaining a routable network address at a device;

authenticating a user at the device;

contacting a provisioning service to obtain a logical IP address, wherein the logical IP address comprises a user identifier portion and a device identifier portion, the user identifier portion corresponding to a specific user and the device identifier portion corresponding to the device, and the logical IP address corresponds to a user-specific IP address for the device so that multiple devices are associated with the specific user, and the multiple devices are on physically distributed networks connected on a virtual subnetwork corresponding to the specific user, the user identifier portion comprising a user network portion and a user portion, the user portion uniquely identifying the user within the virtual subnetwork;

installing software components on the device, the software components comprising a provisioning application, tunnel router, and key store, the provisioning application installed on the device to configure the user-specific IP address for the device;

saving one or more security keys in the key store, wherein the one or more security keys are associated with the virtual subnetwork corresponding to the specific user;

installing the logical IP address at the device;

registering the logical IP address with a device map server;

activating the tunnel router, wherein the tunnel router communicates with multiple devices for the virtual subnetwork; and sending and receiving at least one secure network message over the tunnel router to at least one of the multiple devices on the virtual subnetwork using the one or more security keys.

2. The method of claim 1, wherein the logical IP address comprises an IPv6 address and the routable network address comprises a routable IPv6 address or a routable IPv4 address.

3. The method of claim 2, in which the routable network address is assigned by a local subnet.

4. The method of claim 2, in which the IPv6 address comprises a static IPv6 address.

5. The method of claim 1, wherein the device corresponds to at least one of a mobile device, personal computing device, a gaming device, a robotic device, a telepresence device, a cloud-based device, or a virtual machine device.

6. The method of claim 1, in which a map-and-encapsulate protocol is used to define a dual-addressing structure for the device.

7. The method of claim 6, in which the tunnel router on the device sends and received the at least one secure network message using the map-and-encapsulate protocol.

8. The method of claim 1, in which a common user network prefix but different user network addresses are assigned to each of the multiple devices associated with the specific user.

9. The method of claim 1, in which a secure communications protocol is employed for communications between the provisioning service and the device, in which the secure communications protocol comprises at least one of an encryption key, a certificate, or a shared secret.

10. The method of claim 1, in which interaction with the provisioning service comprises:
    contacting a user network ID provisioning service;
    performing authentication actions;
    receiving a logical IP address; and
    establishing security keys.

11. The method of claim 10, which includes downloading and installing a tunnel router component from the provisioning service.

12. The method of claim 10, in which a Domain Name System (DNS) is used to register the logical IP address and a device-specific host name.

13. The method of claim 1, in which the device corresponds to a tethering device which is connected to one or more tethered devices by means of a digital communication channel.

14. The method of claim 13, in which the tethering device performs the step of contacting the provisioning service to obtain a logical IP address for the tethered device, wherein the logical IP address comprises a user identifier portion and a device identifier portion, the user identifier portion corresponding to the specific user and the device identifier portion corresponding to the tethered device, and the logical IP address permits the tethered device associated with the specific user to be connected via the tethering device on a virtual subnetwork corresponding to the specific user.

15. The method of claim 13, in which the tethering device is set up as a tunnel router to the one or more tethered devices.

16. The method of claim 7, wherein the tunnel router is activated only for as long as the specific user is authenticated on the device.

17. A computer program product embodied on a non-transitory computer usable medium, the non-transitory computer usable medium having stored thereon a sequence of instructions which, when executed by a processor causes the processor to execute a method for setting up a user-specific IP address at a computing device, the method comprising:
    obtaining a routable network address at a device;
    authenticating a user at the device;
    contacting a provisioning service to obtain a logical IP address, wherein the logical IP address comprises a user identifier portion and a device identifier portion, the user identifier portion corresponding to a specific user and the device identifier portion corresponding to the device, and the logical IP address corresponds to a user-specific IP address for the device so that multiple devices are associated with the specific user, and the multiple devices are on physically distributed networks connected on a virtual subnetwork corresponding to the specific user, the user identifier portion comprising a user network portion and a user portion, the user portion uniquely identifying the user within the virtual subnetwork;
    installing software components on the device, the software components comprising a provisioning application, tunnel router, and key store, the provisioning application installed on the device to configure the user-specific IP address for the device;
    saving one or more security keys in the key store, wherein the one or more security keys are associated with the virtual subnetwork corresponding to the specific user;
    installing the logical IP address at the device;
    registering the logical IP address with a device map server;
    activating the tunnel router, wherein the tunnel router communicates with multiple devices for the virtual subnetwork; and
    sending and receiving at least one secure network message over the tunnel router to at least one of the multiple devices on the virtual subnetwork using the one or more security keys.

18. The computer program product of claim 17, wherein the logical IP address comprises an IPv6 address and the routable network address comprises a routable IPv6 address or a routable IPv4 address.

19. The computer program product of claim 18, in which the routable network address is assigned by a local subnet.

20. The computer program product of claim 17, wherein the device corresponds to at least one of a mobile device, personal computing device, a gaming device, a robotic device, a telepresence device, a cloud-based device, or a virtual machine device.

21. The computer program product of claim 17, in which a map-and-encapsulate protocol is used to define a dual-addressing structure for the device.

22. The computer program product of claim 17, in which a common user network prefix but different user network addresses are assigned to each of the multiple devices associated with the specific user.

23. The computer program product of claim 17, in which a secure communications protocol is employed for communications between the provisioning service and the device, in which the secure communications protocol comprises at least one of an encryption key, a certificate, or a shared secret.

24. The computer program product of claim 17, in which interaction with the provisioning service comprises:
    contacting a user network ID provisioning service;
    performing authentication actions;
    receiving a logical IP address; and
    establishing security keys.

25. The computer program product of claim 17, in which the device corresponds to a tethering device which is connected to one or more tethered devices by means of a digital communication channel.

26. The computer program product of claim 25, in which the tethering device performs the step of contacting the provisioning service to obtain a logical IP address for the tethered device, wherein the logical IP address comprises a user identifier portion and a device identifier portion, the user identifier portion corresponding to the specific user and the device identifier portion corresponding to the tethered device, and the logical IP address permits the tethered device associated with the specific user to be connected via the tethering device on a virtual subnetwork corresponding to the specific user.

27. The computer program product of claim 25, in which the tethering device is set up as a tunnel router to the one or more tethered devices.

28. A system for setting up a user-specific IP address at a computing device, comprising:
   a processor;
   a memory for holding programmable code; and
   wherein the programmable code includes instructions for obtaining a routable network address at a device, authenticating a user at the device, contacting a provisioning service to obtain a logical IP address, wherein the logical IP address comprises a user identifier portion and a device identifier portion, the user identifier portion corresponding to a specific user and the device identifier portion corresponding to the device, and the logical IP address corresponds to a user-specific IP address for the device so that multiple devices are associated with the user, and the multiple devices are on physically distributed networks connected on a virtual subnetwork corresponding to the specific user, the user identifier portion comprising a user network portion and a user portion, the user portion uniquely identifying the user within the virtual subnetwork, installing software components on the device, the software components comprising a provisioning application, tunnel router, and key store, the provisioning application installed on the device to configure the user-specific IP address for the device, saving one or more security keys in the key store, wherein the one or more security keys are associated with the virtual subnetwork corresponding to the specific user, installing the logical IP address at the device, registering the logical IP address with a device map serve, activating the tunnel router, wherein the tunnel router communicates with multiple devices for the virtual subnetwork, and sending and receiving at least one secure network message over the tunnel router to at least one of the multiple devices on the virtual subnetwork using the one or more security keys.

29. The system of claim 28, wherein the logical IP address comprises an IPv6 address and the routable network address comprises a routable IPv6 address or a routable IPv4 address.

30. The system of claim 28, wherein the device corresponds to at least one of a mobile device, personal computing device, a gaming device, a robotic device, a telepresence device, a cloud-based device, or a virtual machine device.

31. The system of claim 28, in which a map-and-encapsulate protocol is used to define a dual-addressing structure for the device.

32. The system of claim 28, in which a common user network prefix but different user network addresses are assigned to each of the multiple devices associated with the specific user.

33. The system of claim 28, in which a secure communications protocol is employed for communications between the provisioning service and the device, in which the secure communications protocol comprises at least one of an encryption key, a certificate, or a shared secret.

34. The system of claim 28, in which interaction with the provisioning service comprises:
   contacting a user network ID provisioning service;
   performing authentication actions;
   receiving a logical IP address; and
   establishing security keys.

35. The system of claim 28, in which the device corresponds to a tethering device which is connected to one or more tethered devices by means of a digital communication channel.

36. The system of claim 35, in which the tethering device performs the step of contacting the provisioning service to obtain a logical IP address for the tethered device, wherein the logical IP address comprises a user identifier portion and a device identifier portion, the user identifier portion corresponding to the specific user and the device identifier portion corresponding to the tethered device, and the logical IP address permits the tethered device associated with the specific user to be connected via the tethering device on a virtual subnetwork corresponding to the specific user.

37. The system of claim 35, in which the tethering device is set up as a tunnel router to the one or more tethered devices.

* * * * *